United States Patent [19]

Farrell et al.

[11] Patent Number: 4,768,990
[45] Date of Patent: Sep. 6, 1988

[54] TELESCOPIC TRIPOT UNIVERSAL JOINT WITH BEARING ROLLERS

[75] Inventors: Robert C. Farrell, Frankenmuth; Raymond J. Schultz, Saginaw, both of Mich.

[73] Assignee: General Motors Corporation, Detroit, Mich.

[21] Appl. No.: 73,834

[22] Filed: Jul. 14, 1987

Related U.S. Application Data

[63] Continuation of Ser. No. 846,053, Mar. 31, 1986, abandoned.

[51] Int. Cl.$^4$ ................................................ F16D 3/30
[52] U.S. Cl. ........................................ 464/111; 384/44; 464/122; 464/168; 464/905
[58] Field of Search ................... 384/44; 464/111, 120, 464/122, 162, 167, 168, 905

[56] References Cited

U.S. PATENT DOCUMENTS

| | | | |
|---|---|---|---|
| 2,532,754 | 12/1950 | Beck, Sr. ............................ | 464/167 |
| 2,910,845 | 11/1959 | Wahlmark ...................... | 464/906 X |
| 2,983,120 | 5/1961 | White ................................ | 464/168 |
| 3,125,870 | 3/1964 | Orain ................................ | 464/111 |
| 3,381,497 | 5/1968 | Allen ................................ | 464/122 |
| 3,584,474 | 6/1971 | Church . | |
| 3,818,721 | 6/1974 | Wahlmark ...................... | 464/111 |
| 3,877,251 | 4/1975 | Wahlmark ...................... | 464/111 |
| 3,884,051 | 5/1975 | Bottoms . | |
| 4,010,625 | 3/1977 | Orain ................................ | 464/111 |
| 4,192,154 | 3/1980 | Nakamura et al. .............. | 464/111 |
| 4,379,706 | 4/1983 | Otsuka et al. .................... | 464/111 |
| 4,472,156 | 9/1984 | Orain ................................ | 464/111 |
| 4,490,126 | 12/1984 | Orain ................................ | 464/111 |
| 4,578,048 | 3/1986 | Hirai et al. ........................ | 464/111 |
| 4,580,995 | 4/1986 | Orain ................................ | 464/111 |
| 4,592,735 | 6/1986 | Orain ............................ | 464/167 X |
| 4,619,628 | 10/1986 | Orain ................................ | 464/111 |

FOREIGN PATENT DOCUMENTS

| | | | |
|---|---|---|---|
| 663236 | 5/1963 | Canada .............................. | 384/44 |
| 57104 | 12/1952 | France ............................ | 464/168 |
| 1339932 | 9/1963 | France ............................ | 464/168 |
| 1341628 | 1/1964 | France ............................ | 464/111 |
| 1442991 | 8/1965 | France . | |
| 40016 | 3/1984 | Japan .............................. | 464/111 |
| 440860 | 1/1968 | Switzerland . | |
| 861088 | 2/1961 | United Kingdom ............. | 464/168 |
| 2176871A | 1/1987 | United Kingdom . | |

Primary Examiner—Daniel P. Stodola
Attorney, Agent, or Firm—F. J. Fodale

[57] ABSTRACT

A telescopic tripot universal joint comprises an inner drive member which has spherical trunnions, an outer drive member which has drive channels with parallel, planar side walls and drive assemblies which are pivotally mounted on the spherical trunnions and disposed in the drive channels. The drive assemblies comprise intermediate drive blocks, bearing rollers which engage the side walls of the drive channels to transmit torque and cage structure which retains the bearing rollers and which is secured to the intermediate drive blocks for simultaneous movement with the intermediate drive block.

23 Claims, 2 Drawing Sheets

TELESCOPIC TRIPOT UNIVERSAL JOINT WITH BEARING ROLLERS

This is a continuation of application Ser. No. 846,053 filed on Mar. 31, 1986, now abandoned.

This invention relates generally to telescopic universal joints and more particularly to stroking type tripot universal joints employed in automotive vehicle axle driveshafts and especially in front-wheel drive vehicles between the transaxle differential and the driving wheel. A stroking or sliding constant velocity joint should not only transmit the torque at various speeds, angles and telescoping positions, but also prevent any vibrations of the engine from being transmitted through the joint and driveshaft to the driving wheel and the vehicle structure. In addition, when the universal joint operates at an angle, it should not produce any oscillating axial excitation which may be capable of initiating vibrations in the driveshaft or in the structure of the vehicle.

U.S. Pat. 3,125,870 granted to Michael Orain, Mar. 24, 1964, discloses a conventional telescopic type tripot universal joint of the prior art which have been one of the best stroking type universal joints available for isolating engine vibrations from the rest of the vehicle. However, these conventional prior art tripot universal joints due to their operating frictional characteristics, produce internally generated oscillating axial forces, which are related to the transmitted torque and the joint angle. During severe accelerations at low vehicle speeds, these cyclic axial forces can be of sufficient magnitude to produce a "shudder" type disturbance which has a frequency equal to three times the shaft speed.

The conventional tripot joint consists typically of an outer housing member with three equally spaced axial ball bores driveably connected to an inner shaft spider member through three trunnion mounted drive balls which are capable of rotatable and slidable movement on their respective spider trunnions.

When the outer and inner drive members are aligned at zero degree joint angle and with axial stroking imposed on the joint under a torsional load, pure rolling motion occurs between the balls and their corresponding ball bores. However, when such a joint is operated with the outer and inner drive members inclined to one another, the balls are brought into an inclined relation with their respective ball bores so that each ball does not roll in the direction of its corresponding bore and consequently, some sliding or skidding along with rolling motion takes place between the two contacting surfaces. As the joint angle increases the amount of sliding also increases, while the amount of rolling decreases. As the joint rotates, this relative rolling-to-sliding relationship of each ball in its housing ball bore varies in an oscillating manner and produces a cyclic axial force along the rotational axis of the joint which has a frequency of three times the shaft speed.

In addition, as the joint rotates at an angle, relative endwise sliding movement of each ball on its corresponding spider trunnion also varies in a similar oscillating manner due to the joint's three per revolution orbiting characteristic. These effects are additive to the previously described cyclic axial force produced by the ball-to-housing ball bore contact relationship.

The object of this invention is to provide a telescopic tripot universal joint which substantially reduces or eliminates the overall level of the frictional effects and the resultant internally generated cyclic axial force produced by a conventional telescopic universal joint.

A feature of the invention is that the telescopic tripot universal joint has three spherical trunnions which are spaced substantially 120 degrees from each other around the rotational axis of the inner drive member.

Another feature of the invention is that the outer drive member or housing has three equally spaced drive channels in which the sides are planar surfaces that are parallel to each other and parallel to the rotational axis of the outer drive member.

Another feature of the invention is that three drive assemblies are pivotally mounted on the three spherical trunnions and disposed in the three drive channels.

Another feature of the invention is that the drive assemblies comprise intermediate drive blocks which carry bearing rollers which engage the planar surfaces of the drive channels to transmit torque via the intermediate drive blocks.

Still another feature of the invention is that the bearing rollers are retained in the intermediate drive blocks by cage means which do not move relative to the intermediate drive block thereby increasing the stroke capability of the joint.

Other objects and features of the invention will become apparent to those skilled in the art as the disclosure is made in the following detailed description of a preferred embodiment of the invention as illustrated in the accompanying sheets of drawing in which.

Figure 1:
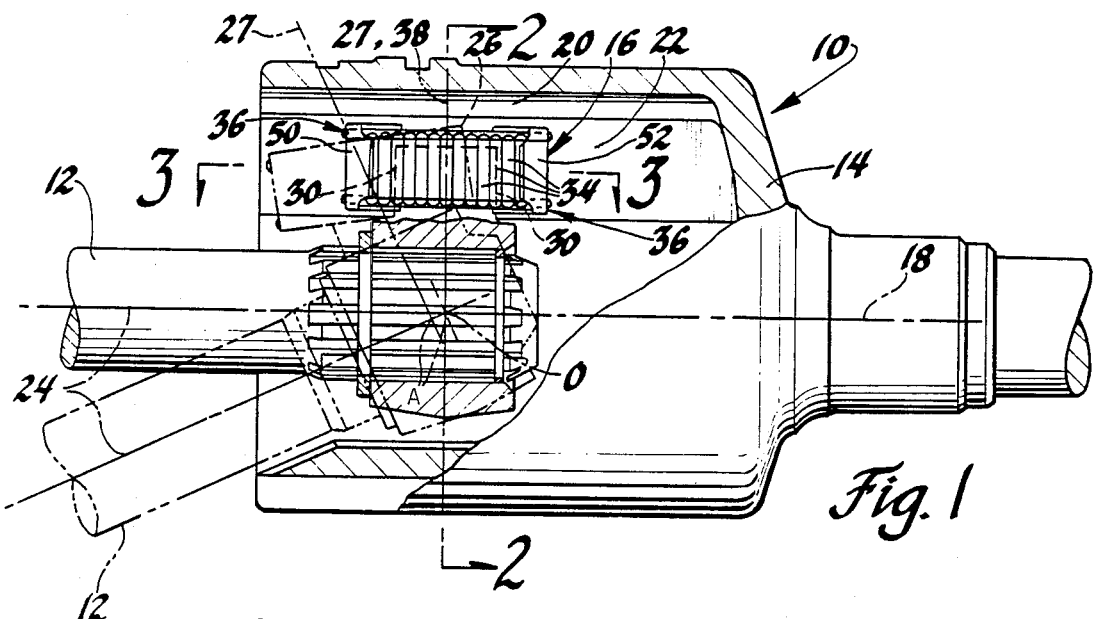
FIG. 1 is a longitudinal section of a telescopic tripot universal joint in accordance with a first embodiment of my invention.

Referring now to the drawing and more particularly to FIGS. 1 through 5, the first embodiment of my invention is illustrated in conjunction with a telescopic tripot universal joint 10 which comprises an inner drive member 12, an outer drive member 14 and a plurality of intermediate drive assemblies 16.

The outer drive member 14 has a longitudinal axis 18 about which it rotated and three radial drive channels 20 which are equally spaced at substantially 120 degrees from each other. Each radial drive channel 20 includes two radially extending, planar surfaces 22 which are parallel to each other and parallel to the longitudinal axis 18.

The inner drive member 12 has a longitudinal axis 24 about which it rotates. The longitudinal axes 18 and 24 coincide when the tripot universal joint 10 is at zero angle as shown in solid lines in FIG. 1 and intersect at a joint center O when the tripot universal joint is articulated or bent at an angle as shown in phantom lines in FIG. 1.

Figure 2:
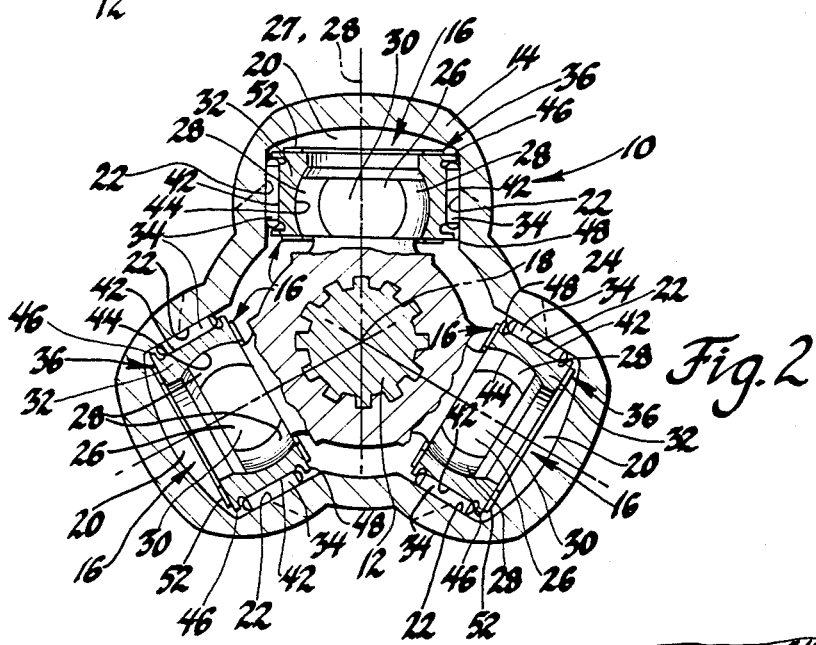
FIG. 2 is a section taken substantially along the line 2—2 of FIG. 1 looking in the direction of the arrows.
Figure 3:
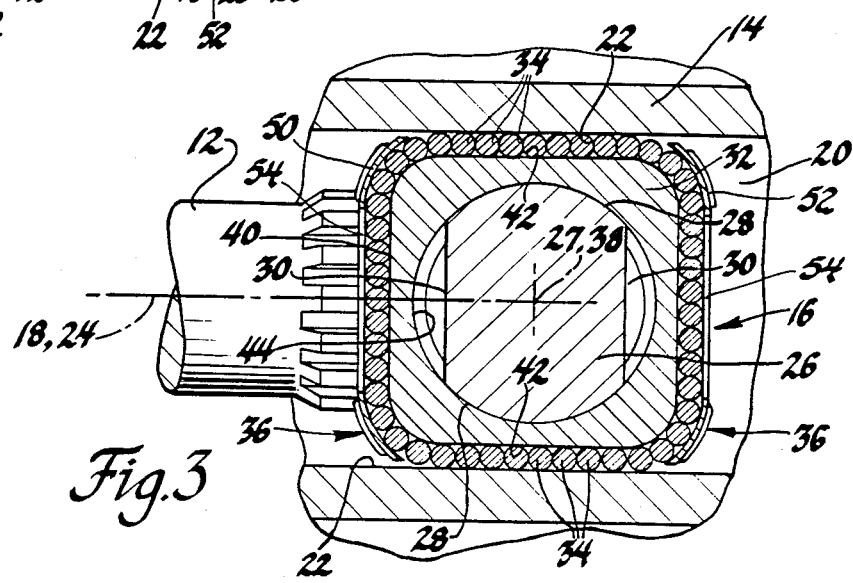
FIG. 3 is a section taken substantially along the line 3—3 of FIG. 1 looking in the direction of the arrows.

The inner drive member 12 has three radial trunnions 26 equally spaced at substantially 120 degrees from each other on coplanar radial axes 27 which intersect the longitudinal axis 24 perpendicularly at a center A. The center A of the inner drive member 12 is displaced from the longitudinal axis 18 of the outer drive member 14 and orbits around the joint center O at three times the joint speed when the tripot universal joint 10 is articulated and rotated at a given speed. The radial trunnions 26 comprise truncated spherical or ball-like portions which have been truncated to provide spherical bearing surfaces 28 in the longitudinal direction of the inner drive member 12 and flat surfaces 30 which are perpendicular to the longitudinal axis 24 as best shown in FIG. 3. The flat surfaces 30 are provided for assembly purposes as explained below. The radial trunnions 26 are disposed in the respective radial drive channels 20 with their spherical bearing surfaces 28 in confronting relation with the planar surfaces 22 of the respective radial drive channels 20 as shown in FIGS. 2 and 3.

The three drive assemblies 16 are disposed in the respective radial drive channels 20 and pivotally mounted on the respective radial trunnions 26. Each drive assembly 16 comprises an intermediate drive block 32, a plurality of bearing rollers 34, and roller cage means 36 retaining the bearing rollers 34.

The intermediate drive block 32 has a continuous or endless roller track 40 which circumscribes an imaginary radial centerline 38 in parallel fashion. The continuous roller track 40 includes two planar surfaces 42 which are parallel to each other and the radial centerline 38 and which are disposed parallel to and facing the planar surfaces 22 of the radial drive channel 20 in which the intermediate driving block 32 is disposed. The intermediate drive block 32 also has a concentric spherical socket 44 which fits onto the spherical bearing surfaces 28 of the radial trunnion 26 whereby the intermediate drive block 32 is pivotally mounted on the radial trunnion 26 disposed in the radial drive channel 20 in which the intermediate drive block 32 is disposed. Two assembly slots 45 extend from an opening of the spherical socket 44 adjacent the hub of the inner drive member 12 to the equator of the spherical socket. These assembly slots 45 are wide enough to permit entry of the spherical bearing surfaces 28 of the trunnions 26 for assembly purposes as explained below.

A full complement of bearing rollers 34 is disposed on the continuous roller track 40 so that a number of bearing rollers 34 are disposed between the planar surfaces 42 of the intermediate drive block 32 and the planar surfaces 22 of the radial drive channel 20 in which the intermediate drive block 32 is disposed.

The roller cage means 36 is carried by the intermediate drive block 32 and retains the bearing rollers 34 for rotation about axes which are substantially parallel to the radial centerline 38 of the intermediate drive block 32 and engagement with the planar surfaces 22 of the radial drive channel 20 to transfer torque via the intermediate drive block 32. In this particular instance the roller cage means 36 comprise upper and lower ledges 46 and 48 of the intermediate drive block 32 which retain the bearing rollers 34 in the centerline direction of the intermediate drive block 32 and two sheet metal cage pieces 50 and 52 which are attached to the longitudinal ends of the intermediate drive block 32.

The sheet metal cage pieces 50 and 52 provide overhanging flanges 54 at the longitudinal ends of the continuous roller track 40 and covers 56 at the corners leading to the two planar surfaces 42. The overhanging flanges 54 and covers 56 retain the bearing rollers 34 in the direction radial of the centerline 38 for the portions of the continuous roller track 40 between the two planar surfaces 42. For the two planar surface portions of the continuous roller track 40, the bearing rollers 34 are retained by grease until the tripot universal joint 10 is assembled whereupon the planar surfaces 22 of the associated radial drive channel 20 retain the bearing rollers 34.

The upper and lower ledges 46 and 48 and the sheet metal cage pieces 50 and 52 are fixedly mounted on the intermediate drive block 32 so that the roller cage means 36 is not displaced relative to the intermediate drive block 32 during operation of the tripot universal joint 10. The bearing rollers 34 roll along the continuous roller track 40 in the manner of a recirculating roller bearing as the radial trunnions 26 and the intermediate drive blocks 32 are displaced relative to the radial drive channels 20 during operation of the tripot universal joint 10.

A slight clearance is provided between the planar surfaces 22 of the radial drive channel 20 and the intermediate drive assembly 16 so that when the joint is stroked axially with torque applied in one direction of rotation, only the active bearing rollers 34 on the torque side of the drive block 32 are under load while rolling in a given direction. Thus, the bearing rollers 34 on the opposite side of the drive block 32 are unloaded and free to travel without interference in the opposite linear direction as they must do since all the bearing rollers 34 in the assembly are part of a recirculating train.

When the tripot universal joint 10 operates at an angle, the intermediate drive assemblies 16 assume varying angular pivoting or tilting positions on the spherical trunnions 16 during one revolution of the joint as indicated in phantom lines in FIG. 1. This is so because of the engagement of the active bearing rollers 34 with the planar surfaces 22 of the drive channels 20. Since the drive assembly 16 permits rolling movement of the bearing rollers 34, the intermediate drive block 32 can pivot on its mating spherical trunnion 26 to an angle of approximately one half of the joint angle. This maximum pivoting angle can be achieved only during the rotational position when the two parallel lines of bearing rollers 34 on the active and inactive sides of the intermediate drive block are aligned with the surfaces 22 of the drive channels 20.

Since the tripot joint 10 must also orbit during rotation like the conventional tripot joint, endwise sliding or skidding movement occurs at the contact surfaces between the bearing rollers 34 and the parallel surfaces 22 of the drive channels 20. However, due to the previously described rolling characteristics of the rolling elements in the roller assemblies, the overall level of the frictional effects and the resultant cyclic axial force is significantly reduced and consequently, the tripot joint 10 substantially reduces or eliminates the "shudder" disturbance level in a front-wheel drive vehicle. In addition, the reduced frictional effects reduce heat generation and improve wear life of the universal joint.

Figure 4:
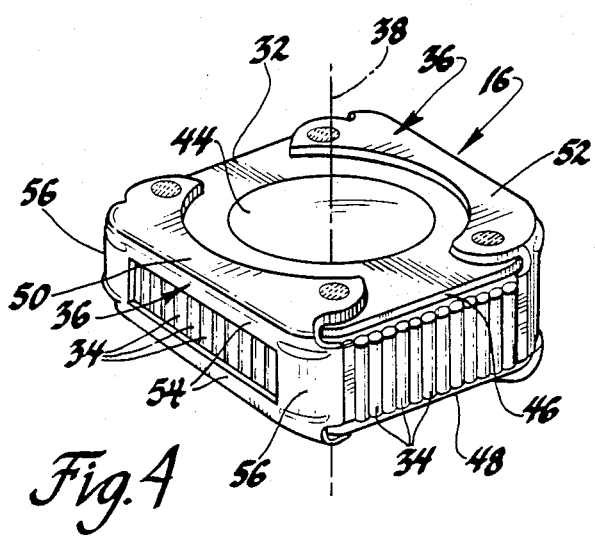
FIG. 4 is a perspective view of a component of the tripot universal joint shown in FIGS. 1, 2 and 3.
Figure 5:
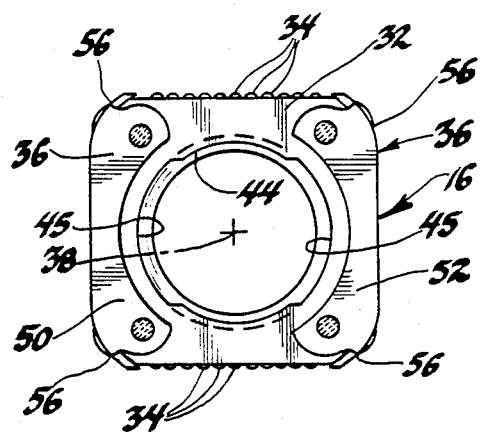
FIG. 5 is a bottom view of the component shown in FIG. 4.

The intermediate drive blocks 32, bearing rollers 34 and sheet metal cage pieces 50 and 52 are manufactured as unit handled drive assemblies 16 such as the unit handled drive assembly 16 shown in FIG. 4. The typical drive assembly 16 is mounted on its associated radial trunnion 26 by inserting the spherical bearing surfaces 28 of the radial trunnion 26 into the socket 44 through the assembly slots 45 and then indexing the the drive assembly 90 degrees so that the spherical bearing surfaces 28 are trapped in the unslotted spherical portions of the socket 44 as shown in FIG. 2.

Figure 6:
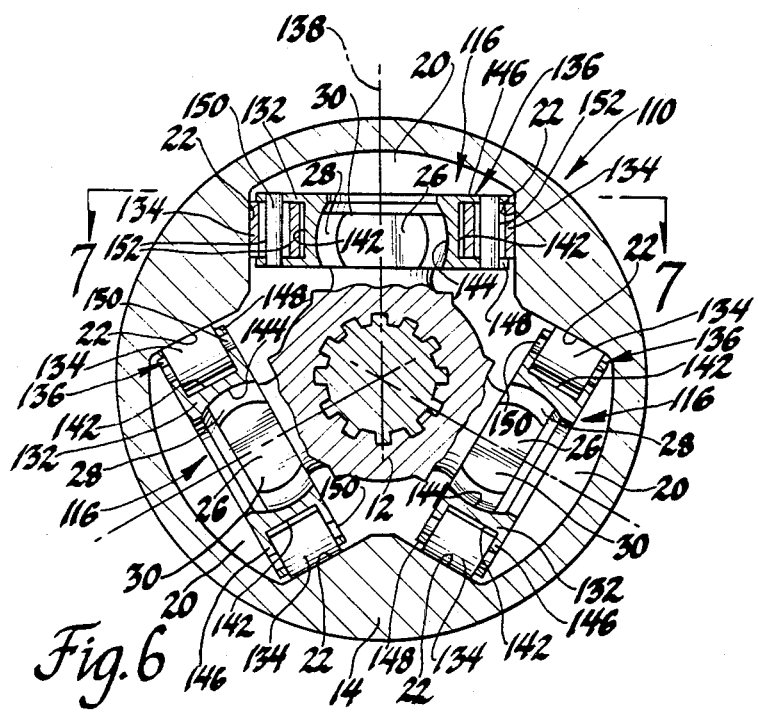
FIG. 6 is a transverse section of a telescopic tripot universal joint in accordance with a second embodiment of my invention.
Figure 7:
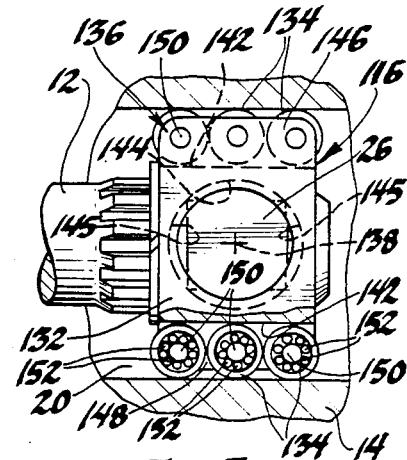
FIG. 7 is a section taken substantially along the line 7—7 of FIG. 6 looking in the direction of the arrows.

Referring now to FIGS. 6 and 7, the second embodiment of my invention is illustrated in conjunction with a telescopic tripot universal joint 110 which is substantially identical to the telescopic tripot universal joint 10 except for the three intermediate drive assemblies 116.

Consequently, the corresponding elements of the tripot universal joints 10 and 110, other than those which are a part of the intermediate drive assemblies 16 or 116, are identified with the same numerals in the several views.

The three drive assemblies 116 are disposed in the respective radial drive channels 20 and pivotally mounted on the respective radial trunnions 26 as before. Each drive assembly 116 likewise comprises an intermediate drive block 132, a plurality of bearing rollers 134, and roller cage means 136 retaining the bearing rollers 134.

The intermediate drive block 132 has an imaginary radial centerline 138 and two planar surfaces 142 which are parallel to each other and the radial centerline 138 and which are disposed parallel to and facing the planar surfaces 22 of the radial drive channel 20 in which the intermediate driving block 132 is disposed. The intermediate drive block 132 also has a concentric spherical socket 144 which fits onto the spherical bearing surfaces 28 of the radial trunnion 26 whereby the intermediate drive block 132 is pivotally mounted on the radial trunnion 26 disposed in the radial drive channel 20 in which the intermediate drive block 132 is disposed. Two assembly slots 145 extend from an opening of the spherical socket 144 to the equator of the spherical socket. These assembly slots 145 are wide enough to permit entry of the spherical bearing surfaces 28 of the trunnions 26 for assembly purposes as explained below.

In this embodiment, separate complements of bearing rollers 134 are provided so that a different set of bearing rollers 134 is disposed between each of the planar surfaces 142 of the intermediate drive block 132 and the planar surfaces 22 of the radial drive channel 20 in which the intermediate drive block 132 is disposed.

The roller cage means 136 is carried by the intermediate drive block 132 and retains the bearing rollers 134 for rotation about axes which are substantially parallel to the radial centerline 138 of the intermediate drive block 132 and engagement with the planar surfaces 22 of the radial drive channel 20 to transfer torque via the intermediate drive block 132. In this embodiment, the roller cage means 136 comprise upper and lower ledges 146 and 148 of the intermediate drive block 132 which retain the bearing rollers 134 in the centerline direction of the intermediate drive block 132 and a plurality of pintles 150 which are attached to the upper and lower ledges 146 and 148 of the intermediate drive block 132. The pintles 150 are disposed parallel to the imaginary centerline 138 of the intermediate drive block 132 and serve as inner bearing races which retain the bearing rollers 134 in the direction radial of the centerline 138. The bearing rollers 134 are rotatably mounted on the pintles 150 by roller complements 152, however a plain bearing arrangement may suffice in some instances.

The upper and lower ledges 146 and 148 and the pintles 150 are fixedly mounted on the intermediate drive block 132 so that the roller cage means 136 is not displaced relative to the intermediate drive block 132 during operation of the tripot universal joint 110. The pintles 150 rotatably mount the bearing rollers 134 so that the bearing rollers 134 are spaced from the planar surfaces 142 of the intermediate drive member 116 and roll along the planar surfaces 22 of the outer drive member 14 as the radial trunnions 26 and the intermediate drive blocks 132 are displaced relative to the radial drive channels 20 during operation of the tripot universal joint 110.

In the tripot universal joint 110, a slight clearance between the bearing rollers 134 and the planar surfaces 22 of the radial drive channels 20 is also beneficial. This clearance reduces the frictional effects that occur when the inner drive member 12 orbits during joint rotation because only the bearing rollers 134 on the torque side of the intermediate drive block 132 slide or skid endwise.

The intermediate drive blocks 132, bearing rollers 134, pintles 150 and bearing complements 152 are also, manufactured as unit handled drive assemblies 116. The typical drive assembly 116 is mounted on its associated radial trunnion 26 by inserting the spherical bearing surfaces 28 of the radial trunnion 26 into the socket 144 through the assembly slots 145 and then indexing the drive assembly 90 degrees so that the spherical bearing surfaces 28 are trapped in the unslotted spherical portions of the socket 144 as shown in FIG. 6.

Figure 8:
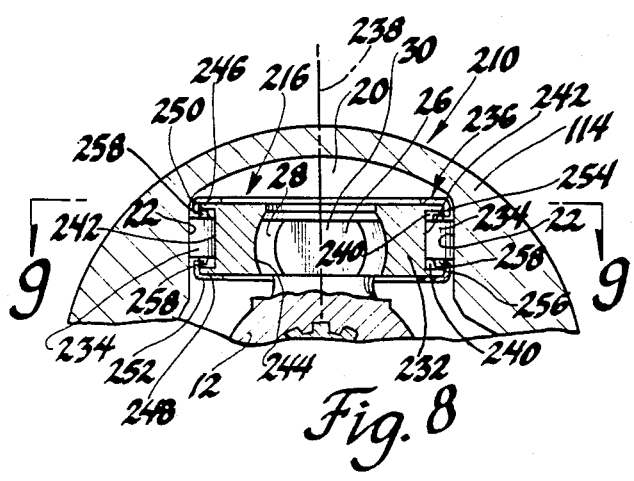
FIG. 8 is a partial transverse section of a telescopic tripot universal joint in accordance with a third embodiment of my invention.
Figure 9:
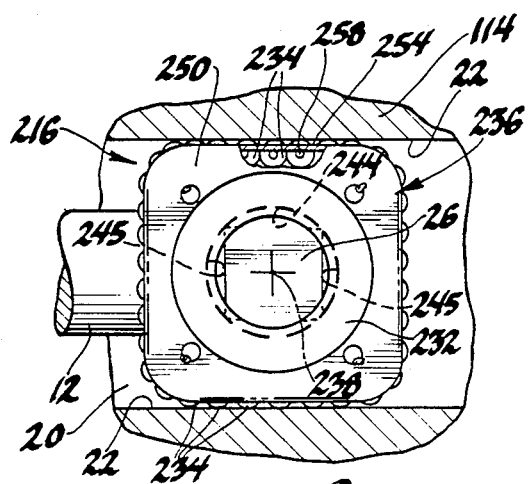
FIG. 9 is a section taken substantially along the line 9—9 of FIG. 8 looking in the direction of the arrows.

Referring now to FIGS. 8 and 9, the third embodiment of my invention is illustrated in conjunction with a telescopic tripot universal joint 210 which is substantially identical to the telescopic tripot universal joints 10 and 110 except for the intermediate drive assemblies 216.

Consequently, the corresponding elements of the tripot universal joints 10, 110 and 210, other than those which are a part of the intermediate drive assemblies 16, 116 or 216, are identified with the same numerals in the several views.

The three drive assemblies 216 are disposed in the respective radial drive channels 20 and pivotally mounted on the spherical trunnions 26 and each drive assembly 216 comprises an intermediate drive block 232, a plurality of bearing rollers 234 and roller cage means 236 as before.

The intermediate drive block 232 has an imaginary radial centerline 238 and a continuous or endless roller track 240 which circumscribes the radial centerline and which includes two planar surfaces 242 which are parallel to each other and the radial centerline 238 and which are disposed parallel to and facing the planar surfaces 22 of the radial drive channel 20 in which the intermediate driving block 232 is disposed. The intermediate drive block 232 also has a concentric spherical socket 244 which fits onto the spherical bearing surfaces 28 of the radial trunnion 26 whereby the intermediate drive block 232 is pivotally mounted on the radial trunnion 26 disposed in the radial drive channel 20 in which the intermediate drive block 232 is disposed. Two assembly slots 245 extend from an opening of the spherical socket 244 to the equator of the spherical socket. These assembly slots 245 are wide enough to permit entry of the spherical bearing surfaces 28 of the trunnions 26 for assembly purposes as explained below.

A full complements of bearing rollers 234 are provided for the roller track 240 so that a number of bearing rollers 234 are disposed between each of the planar surfaces 242 of the intermediate drive block 232 and the planar surfaces 22 of the radial drive channel 20 in which the intermediate drive block 232 is disposed.

The roller cage means 236 is carried by the intermediate drive block 232 and retains the bearing rollers 234 for rotation about axes which are substantially parallel to the radial centerline 238 of the intermediate drive block 232 and engagement with the planar surfaces 22 of the radial drive channel 20 to transfer torque via the intermediate drive block 232. In this embodiment, the roller cage means 236 comprise upper and lower ledges 246 and 248 of the intermediate drive block 232 which retain the bearing rollers 234 in the centerline direction of the intermediate drive block 232 and upper and lower, flanged, sheet metal, cage pieces 250 and 252.

The cage pieces 250 and 252 are attached to the top and bottom of the intermediate drive block 232 so that their respective flanges 254 and 256 provide upper and lower flanges which extend around the entire periphery of the intermediate drive block 232 in an overhanging relationship with the upper and lower ledges 246 and 248 respectively. The bearing rollers 234 have integral end pintles 258 which are disposed inwardly of the flanges 254 and 256 which overhang the upper and lower ledges 246 and 248 of the intermediate drive block 232 and thus the cage pieces 250 and 252 retain the bearing rollers 234 in the direction radial of the centerline 238 for their entire travel around the continuous roller track 240.

The upper and lower ledges 246 and 248 and cage pieces 250 and 252 are fixedly mounted on the intermediate drive block 232 so that the roller cage means 236 is not displaced relative to the intermediate drive block 232 during operation of the tripot universal joint 210. The bearing rollers 234 roll along the continuous roller track 240 in the manner of a recirculating roller bearing as the radial trunnions 26 and the intermediate drive blocks 232 are displaced relative to the radial drive channels 20 during operation of the telescopic tripot universal joint 210. As before, a slight clearance is provided so that only the active bearing rollers 234 are under a load and the complement of bearing rollers 234 can circulate with a minimum of resistance.

The intermediate drive blocks 232, bearing rollers 234, cage pieces 250 and 252 are likewise manufactured as unit handled drive assemblies 216. The typical drive assembly 216 is mounted on its associated radial trunnion 26 by inserting the spherical bearing surfaces 28 of the radial trunnion 26 into the socket 244 through the assembly slots 245 and then indexing the drive assembly 90 degrees so that the spherical bearing surfaces 28 are trapped in the unslotted spherical portions of the socket 244 as shown in FIG. 8.

I wish it to be understood that I do not desire to be limited to the exact details of construction shown and described, for obvious modifications will occur to a person skilled in the art.

The embodiments of the invention in which an exclusive property or privilege is claimed are defined as follows:

1. A telescopic tripot universal joint comprising:
 a first drive member having a first longitudinal axis and three radial drive channels equally spaced at substantially 120 degrees from each other, each radial drive channel including two radially extending, planar surfaces which are parallel to each other and parallel to the first longitudinal axis of the first drive member,
 a second drive member having a second longitudinal axis and three radial trunnions equally spaced at substantially 120 degrees from each other, said radial trunnions having radially fixed spherical bearing surfaces and being disposed in the respective radial drive channels with their spherical bearing surfaces in confronting relation with the planar surfaces of the respective radial drive channels; and
 three drive assemblies which are pivotally mounted in fixed radial positions on the spherical bearing surfaces of the respective radial trunnions and which have rollers which engage the planar surfaces of the respective radial drive channels so that the drive assemblies are free to tilt and move radially in the radial drive channels, each drive assembly comprising:
 an intermediate drive clock having an imaginary radial centerline; surfaces which are spaced from each other and the radial centerline and which are disposed facing the planar surfaces of the radial drive channel in which the intermediate driving block is disposed; and a spherical socket which fits onto the sperical bearing surfaces of the radial trunnion whereby the intermediate drive block is pivotally mounted on the radial trunnion disposed in the radial drive channel in which the intermediate drive block is disposed,
 the rollers associated with said drive assembly including rollers disposed between the surfaces of the intermediate drive block and the planar surfaces of the radial drive channel in which the intermediate drive block is disposed, and
 roller cage means carried by the intermediate drive block for retaining the rollers associated with said drive assembly for rotation about axes which are substantially parallel to the radial centerline of the intermediate drive block and engagement with the planar surfaces of the radial drive channel to transfer torque via the intermediate drive block,
 said roller cage means being fixedly mounted on the intermediate drive block so that the roller cage means is not displaced relative to the intermediate drive block during operation of the tripot universal joint.

2. The telescopic tripot universal joint as defined in claim 1 wherein each intermediate drive block has a continuous roller track which circumscribes the radial centerline of the intermediate drive block and which includes planar surfaces which are parallel to each other and the radial centerline and which are disposed parallel to and facing the planar surfaces of the radial drive channel in which the intermediate drive block is disposed.

3. The telescopic tripot universal joint as defined in claim 2 wherein each intermediate drive block has a full complement of bearing rollers disposed on its continuous roller track.

4. The telescopic tripot universal joint as defined in claim 3 wherein the roller cage means comprise upper and lower ledges of the intermediate drive block which retain the bearing rollers in the centerline direction of the intermediate drive block and cage pieces which are attached to the intermediate drive block to retain the bearing rollers in the direction radial of the centerline for at least the portions of the continuous roller track between the two planar surfaces.

5. The telescopic tripot universal joint as defined in claim 4 wherein the cage pieces are attached to the longitudinal ends of the intermediate drive block respectively and include flanges which overhang the upper and lower ledges at the longitudinal ends of the continuous roller track and covers at the corners leading to the two planar surfaces of the continuous roller track, and wherein the bearing rollers at the two planar surfaces are retained by grease until the tripot universal joint is assembled.

6. The telescopic tripot universal joint as defined in claim 1 wherein the roller cage means comprise upper and lower ledges of the intermediate drive block which retain the bearing rollers in the centerline direction of the intermediate drive block and members which are attached to the intermediate drive block to retain the bearing rollers in the direction radial of the centerline.

7. The telescopic tripot universal joint as defined in claim 6 wherein the members comprise pintles which are attached to the upper and lower ledges of the intermediate drive block and which rotatably mount the drive rollers for engagement with the planar surfaces of the drive channel in which the intermediate drive member is disposed.

8. The telescopic tripot universal joint as defined in claim 6 wherein the members comprise cage pieces which are attached to the longitudinal ends of the intermediate drive block respectively and include means at the corners and longitudinal ends of the intermediate drive block to retain the bearing rollers in the direction radial of the centerline.

9. A telescopic tripot universal joint comprising:
a first drive member having a first longitudinal axis and three radial drive channels equally spaced at substantially 120 degrees from each other, each radial drive channel including two radially extending, planar surfaces which are parallel to each other and parallel to the first longitudinal axis of the first drive member,
a second drive member having a second longitudinal axis and three radial trunnions equally spaced at substantially 120 degrees from each other, said radial trunnions having radially fixed spherical bearing surfaces and being disposed in the respective radial drive channels with their spherical bearing surfaces in confronting relation with the planar surfaces of the respective radial drive channels; and
three drive assemblies which are pivotally mounted in fixed radial positions on the spherical bearing surfaces of the respective radial trunnions and which have rollers which engage the planar surfaces of the respective radial drive channels so that the drive assemblies are free to tilt and move radially in the radial drive channels, each drive assembly comprising:
an intermediate drive block having an imaginary radial centerline; a continuous roller track which circumscribes the radial centerline and which includes surfaces which are spaced from each other and the radial centerline and which are disposed facing the planar surfaces of the radial drive channel in which the intermediate driving block is disposed; and a spherical socket which fits onto the spherical bearing surfaces of the radial trunnion whereby the intermediate drive block is pivotally mounted on the radial trunnion disposed in the radial drive channel in which the intermediate drive block is disposed,
the rollers associated with the drive assembly being disposed on the continuous roller track so that a number of said rollers are disposed between the surfaces of the intermediate drive block and the planar surfaces of the radial drive channel in which the intermediate drive block is disposed, and
roller cage means carried by the intermediate drive block for retaining the rollers associated with the drive assembly for rotation about axes which are substantially parallel to the radial centerline of the intermediate drive block and engagement with the planar surfaces of the radial drive channel to transfer torque via the intermediate drive block,
said roller cage means being fixedly mounted on the intermediate drive block so that the rollers roll along the continuous roller track in the manner of a recirculating roller bearing as the intermediate drive block is displaced relative to the radial drive channel during operation of the telescopic tripot universal joint.

10. The telescopic tripot universal joint as defined in claim 9 wherein the continuous roller track of each intermediate drive block includes planar surfaces which are parallel to each other and the radial centerline and which are disposed parallel to and facing the planar surfaces of the radial drive channel in which the intermediate drive block is disposed.

11. The telescopic tripot universal joint as defined in claim 10 wherein each intermediate drive block has a full complement of bearing rollers disposed on its continuous roller track.

12. The telescopic tripot universal joint as defined in claim 11 wherein the roller cage means comprise upper and lower ledges of the intermediate drive block which retain the bearing rollers in the centerline direction of the intermediate drive block and cage pieces which are attached to the intermediate drive block to retain the bearing rollers in the direction radial of the centerline for at least the portions of the continuous roller track between the two planar surfaces.

13. The telescopic tripot universal joint as defined in claim 12 wherein the cage pieces are attached to the longitudinal ends of the intermediate drive block respectively and include flanges which overhang the upper and lower ledges at the longitudinal ends of the continuous roller track and covers at the corners leading to the two planar surfaces of the continuous roller track.

14. The telescopic tripot universal joint as defined in claim 13 wherein the bearing rollers at the two planar surfaces are retained by grease until the tripot universal joint is assembled.

15. The telescopic tripot universal joint as defined in claim 12 wherein the cage pieces include flanges which overhang the upper and lower ledges of the intermediate drive block and the bearing rollers have ends which are disposed inwardly of the flanges which overhang the upper and lower ledges of the intermediate drive member whereby the bearing rollers are retained in the direction radial of the centerline of the intermediate drive block.

16. A telescopic tripot universal joint comprising:
a first drive member having a first longitudinal axis and three radial drive channels equally spaced at substantially 120 degrees from each other, each radial drive channel including two radially extending, planar surfaces which are parallel to each other and parallel to the first longitudinal axis of the first drive member, a second drive member having a second longitudinal axis and three radial trunnions equally spaced at substantially 120 degrees from each other, said radial trunnions having radially fixed spherical bearing surfaces and being disposed in the respective radial drive channels with their spherical bearing surfaces in confronting relation with the planar surfaces of the respective radial drive channels; and three drive assemblies which are pivotally mounted in fixed radial positions on the spherical bearing surfaces of the respective radial trunnions and which have rollers which engage the planar surfaces of the respective radial drive channels so that the drive assemblies are free to tilt and move radially in the radial drive channels, each drive assembly comprising:

an intermediate drive block having an imaginary radial centerline; a continuous roller track which circumscribes the radial centerline and which includes planar surfaces which are spaced from each other and the radial centerline and which are disposed facing the planar surfaces of the radial drive channel in which the intermediate drive block is disposed; and a spherical socket which fits onto the spherical bearing surfaces of the radial trunnion whereby the intermediate drive block is pivotally mounted on the radial trunnion disposed in the radial drive channel in which the intermediate drive block is disposed, a full complement of said rollers being disposed on the continuous roller track so that a number of said rollers are disposed between the planar surfaces of the intermediate drive block and the planar surfaces of the radial drive channel in which the intermediate drive block is disposed, and roller cage means carried by the intermediate drive block for retaining the full complement of rollers for rotation about axes which are substantially parallel to the radial centerline of the intermediate drive block and engagement with the planar surfaces of the radial drive channel to transfer torque via the intermediate drive block, said roller cage means being fixedly mounted on the intermediate drive block so that the rollers roll along the continuous roller track in the manner of a recirculating roller bearing as the intermediate drive block is displaced relative to the radial drive channel during operation of the telescopic tripot universal joint.

17. The telescopic tripot universal joint as defined in claim 16 wherein the roller cage means comprise upper and lower ledges of the intermediate drive block which retain the bearing rollers in the centerline direction of the intermediate drive block and members which are attached to the intermediate drive clock to retain the bearing rollers in the direction radial of the centerline.

18. The telescopic tripot universal joint as defined in claim 17 wherein the members comprise cage pieces which are attached to the longitudinal ends of the intermediate drive member and include flanges which overhang the upper and lower ledges at the longitudinal ends of the continuous roller track and covers at the corners leading to the planar surfaces of the continuous roller track.

19. The telescopic tripot universal joint as defined in claim 18 wherein the bearing rollers at the two planar surfaces are retained by grease until the tripot universal joint is assembled.

20. The telescopic tripot universal joint as defined in claim 17 wherein the cage pieces include flanges which overhang the upper and lower ledges of the intermediate drive member and the bearing rollers have ends which are disposed inwardly of the flanges which overhang the upper and lower ledges of the intermediate drive member whereby the bearing rollers are retained in the direction radial of the centerline of the intermediate drive block.

21. The telescopic tripot universal joint as defined in claim 17 wherein the members comprise cage pieces which are attached to the top and bottom of the intermediate drive block and include flanges in an overhanging relationship with the upper and lower ledges respectively to retain the bearing rollers in the direction radial of the centerline.

22. A telescopic tripot universal joint comprising:
a first drive member having three circumferentially spaced radial drive channels which include two radially extending, planar surfaces which are parallel to each other,
a second drive member having three circumferentially spaced radial trunnions which have radially fixed spherical bearing surfaces, and
three drive assemblies having intermediate drive blocks which have spaced surfaces facing the planar surfaces of the respective radial drive channels and which have spherical sockets which fit onto the spherical bearing surfaces of the respective radial trunnions,
said drive assemblies including rollers disposed adjacent the spaced surfaces of the intermediate drive blocks and engaging the planar surfaces of the radial drive channels and roller cage means carried by the intermediate drive blocks for retaining the rollers which are fixedly mounted on the intermediate drive blocks to move in unison with the intermediate drive block during operation of the tripot universal joint,
said radially extending, planar surfaces of the radial drive channels being configured to permit tilting and radial movement of the drive assemblies in the radial drive channels during operation of the tripot universal joint at an angle.

23. A telescopic tripot universal joint comprising:
a first drive member having three circumferentially spaced radial drive channels which include two radially extending, planar surfaces which are parallel to each other,
a second drive member having three circumferentially spaced radial trunnions which have radially fixed spherical bearing surfaces, and
three drive assemblies having intermediate drive blocks which have continuous roller tracks disposed between the planar surfaces of the respective radial drive channels and which have spherical sockets which fit onto the spherical bearing surfaces of the respective radial trunnions,
said drive assemblies including pluralities of bearing rollers disposed on the respective continuous roller tracks for engaging the planar surfaces of the respective radial drive channels and roller cage means carried by the intermediate drive blocks for retaining the bearing rollers which are fixedly mounted on the intermediate drive blocks to move in unison with the intermediate drive blocks during operation of the tripot universal joint, said radially extending, planar surfaces of the radial drive channels being configured to permit tilting and radial movement of the drive assemblies in the radial drive channels during operation of the tripot universal joint at an angle.

* * * * *